(12) United States Patent
Neely

(10) Patent No.: US 12,439,947 B2
(45) Date of Patent: Oct. 14, 2025

(54) PRODUCE WASHING APPLIANCE

(71) Applicant: Theresa Neely, Cherryville, NC (US)

(72) Inventor: Theresa Neely, Cherryville, NC (US)

( * ) Notice: Subject to any disclaimer, the term of this patent is extended or adjusted under 35 U.S.C. 154(b) by 430 days.

(21) Appl. No.: 17/718,406

(22) Filed: Apr. 12, 2022

(65) Prior Publication Data

US 2023/0320402 A1     Oct. 12, 2023

(51) Int. Cl.
| | |
|---|---|
| *A23N 12/02* | (2006.01) |
| *B05B 9/00* | (2006.01) |
| *B05B 12/10* | (2006.01) |
| *B05B 13/02* | (2006.01) |

(52) U.S. Cl.
CPC .............. *A23N 12/02* (2013.01); *B05B 9/002* (2013.01); *B05B 12/10* (2013.01); *B05B 13/0228* (2013.01)

(58) Field of Classification Search
CPC .... B08B 3/00; B08B 3/02; B08B 3/04; B08B 3/045; B08B 3/047; B08B 3/10; A23N 12/00; A23N 12/02; A23N 12/023; A23N 12/06; A47J 43/24; A23L 5/57
See application file for complete search history.

(56) References Cited

U.S. PATENT DOCUMENTS

| | | | | |
|---|---|---|---|---|
| 2,914,935 | A * | 12/1959 | Sampsel | D06F 34/24 |
| | | | | 68/12.22 |
| 4,501,952 | A * | 2/1985 | Lehrke | F24H 15/37 |
| | | | | 165/184 |
| 9,924,839 | B2 | 3/2018 | Hoye | |
| 10,058,119 | B1 | 8/2018 | Chen | |
| 10,383,353 | B2 | 8/2019 | Zhang | |
| 10,702,103 | B2 | 7/2020 | Chen | |
| 2009/0266383 | A1 | 10/2009 | Wang | |
| 2012/0260957 | A1 | 10/2012 | Lee | |
| 2015/0020318 | A1 * | 1/2015 | Seo | D06F 23/02 |
| | | | | 68/12.19 |
| 2019/0350246 | A1 | 11/2019 | Greene | |

* cited by examiner

*Primary Examiner* — David G Cormier

(57) ABSTRACT

The produce washing appliance is an electrically powered mechanical device. The produce washing appliance is configured for use with vegetables. The produce washing appliance is an appliance that cleans the vegetables. The produce washing appliance comprises a housing structure, a fluid transport structure, and a control circuit. The housing structure contains the fluid transport structure, the control circuit, and the vegetables. The produce washing fluid transport structure provides water used to clean the vegetables. The control circuit controls the operation of the produce washing appliance.

10 Claims, 5 Drawing Sheets

PRODUCE WASHING APPLIANCE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of machines for cleaning vegetables. (A23N12/02)

SUMMARY OF INVENTION

The produce washing appliance is an electrically powered mechanical device. The produce washing appliance is configured for use with vegetables. The produce washing appliance is an appliance that cleans the vegetables. The produce washing appliance comprises a housing structure, a fluid transport structure, and a control circuit. The housing structure contains the fluid transport structure, the control circuit, and the vegetables. The produce washing fluid transport structure provides water used to clean the vegetables. The control circuit controls the operation of the produce washing appliance.

These together with additional objects, features and advantages of the produce washing appliance will be readily apparent to those of ordinary skill in the art upon reading the following detailed description of the presently preferred, but nonetheless illustrative, embodiments when taken in conjunction with the accompanying drawings.

In this respect, before explaining the current embodiments of the produce washing appliance in detail, it is to be understood that the produce washing appliance is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the produce washing appliance.

It is therefore important that the claims be regarded as including such equivalent construction insofar as they do not depart from the spirit and scope of the produce washing appliance. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
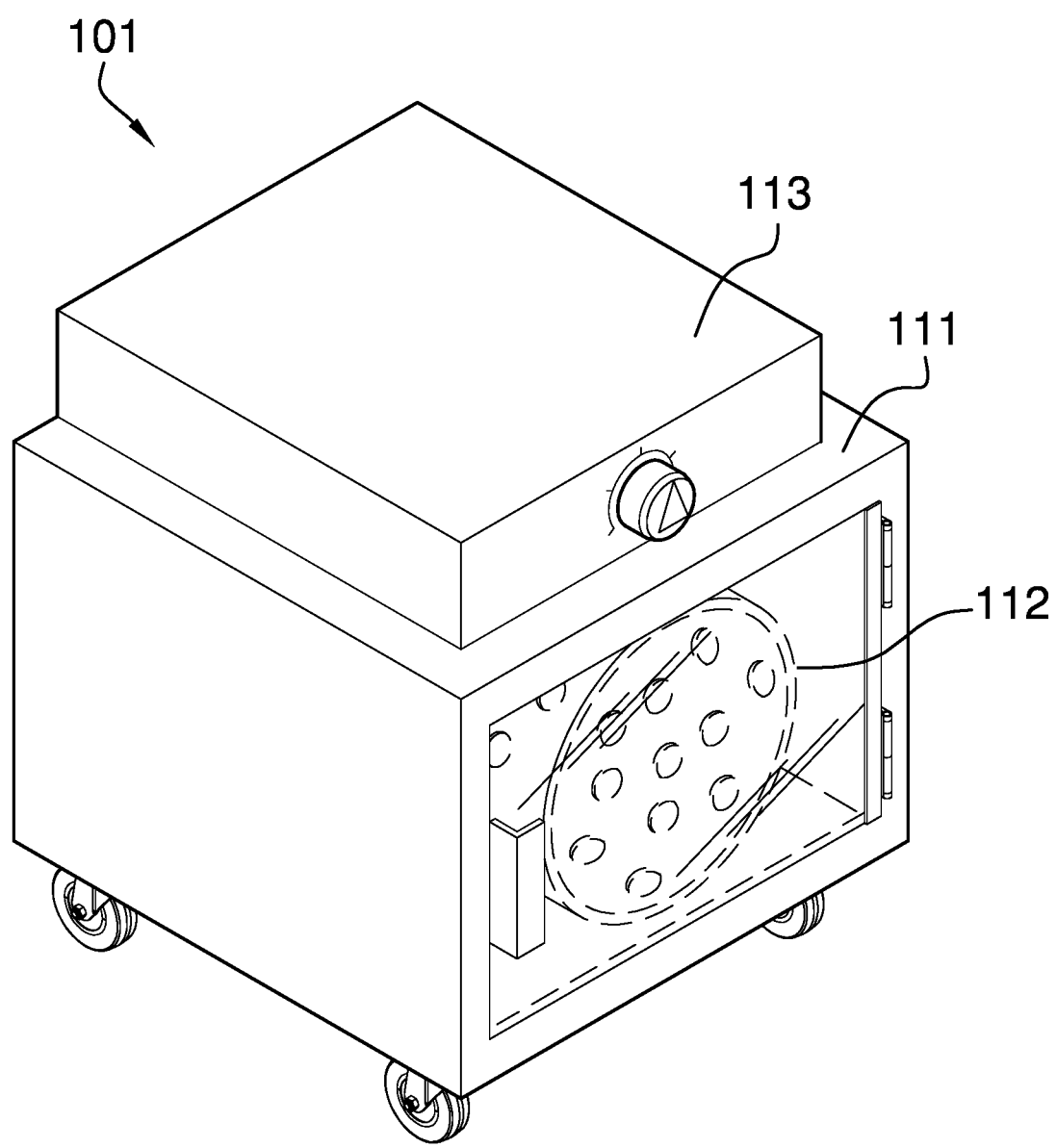
FIG. 1 is a perspective view of an embodiment of the disclosure.
Figure 2:
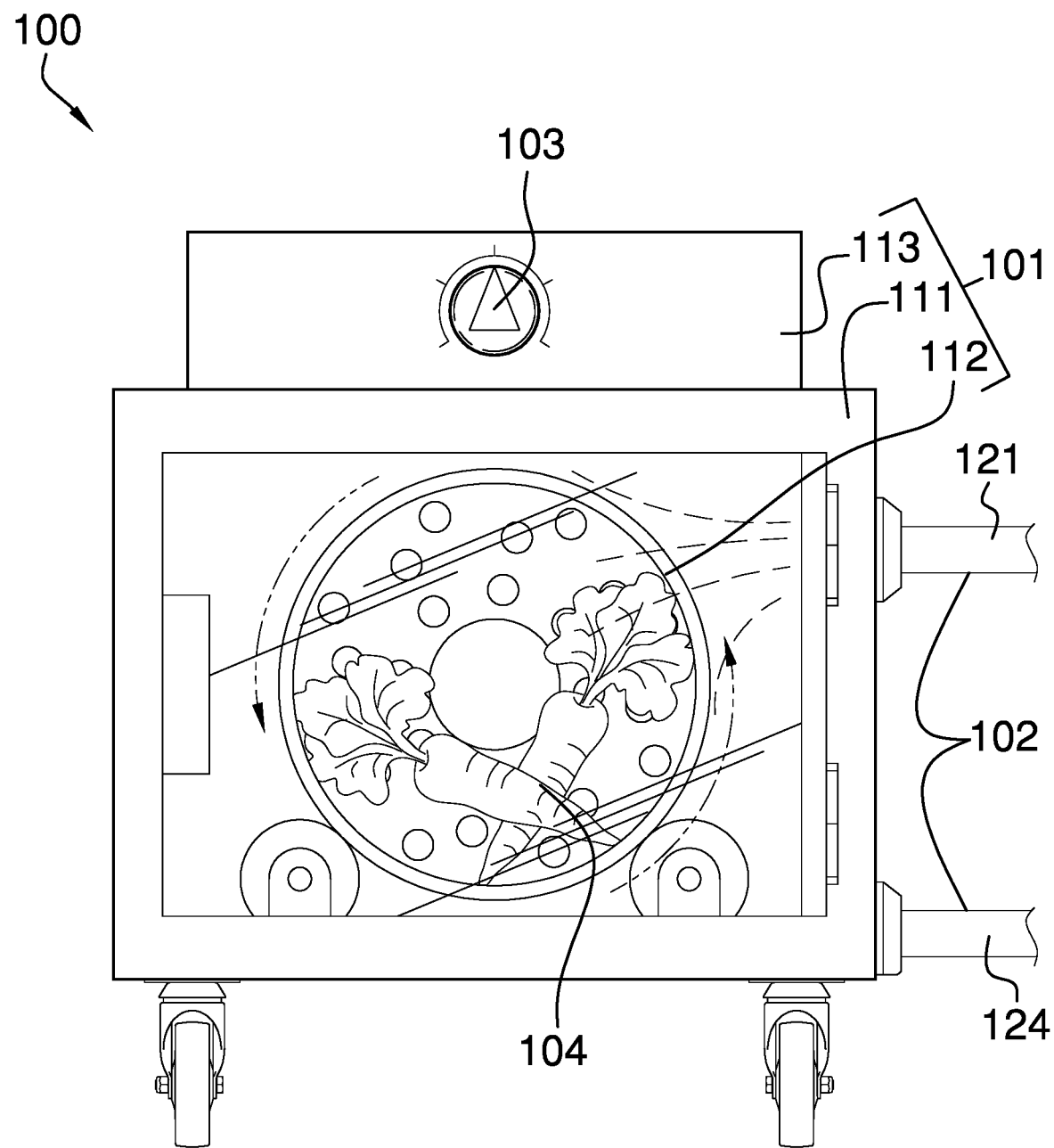
FIG. 2 is a front view of an embodiment of the disclosure.
Figure 3:
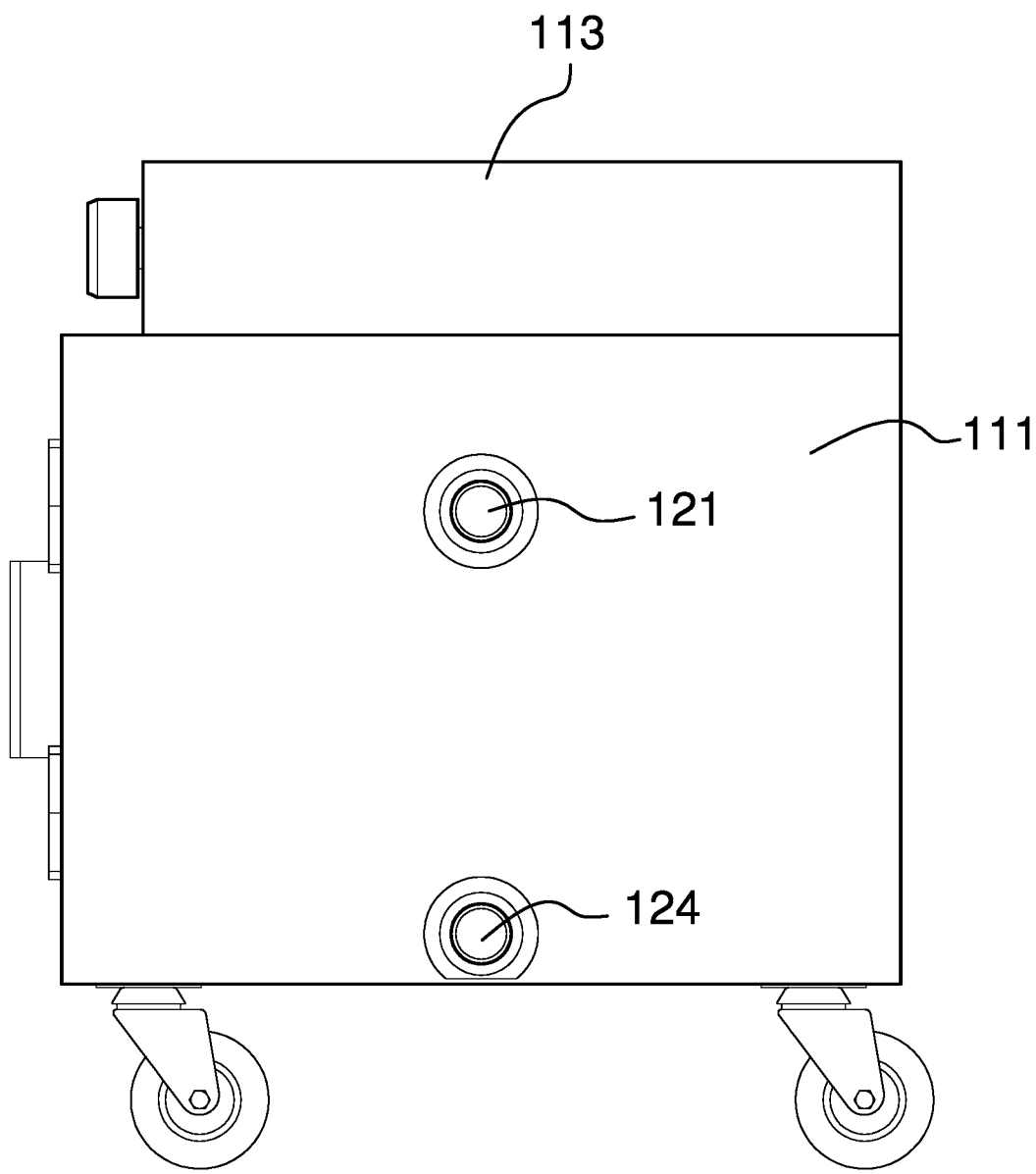
FIG. 3 is a side view of an embodiment of the disclosure.
Figure 4:
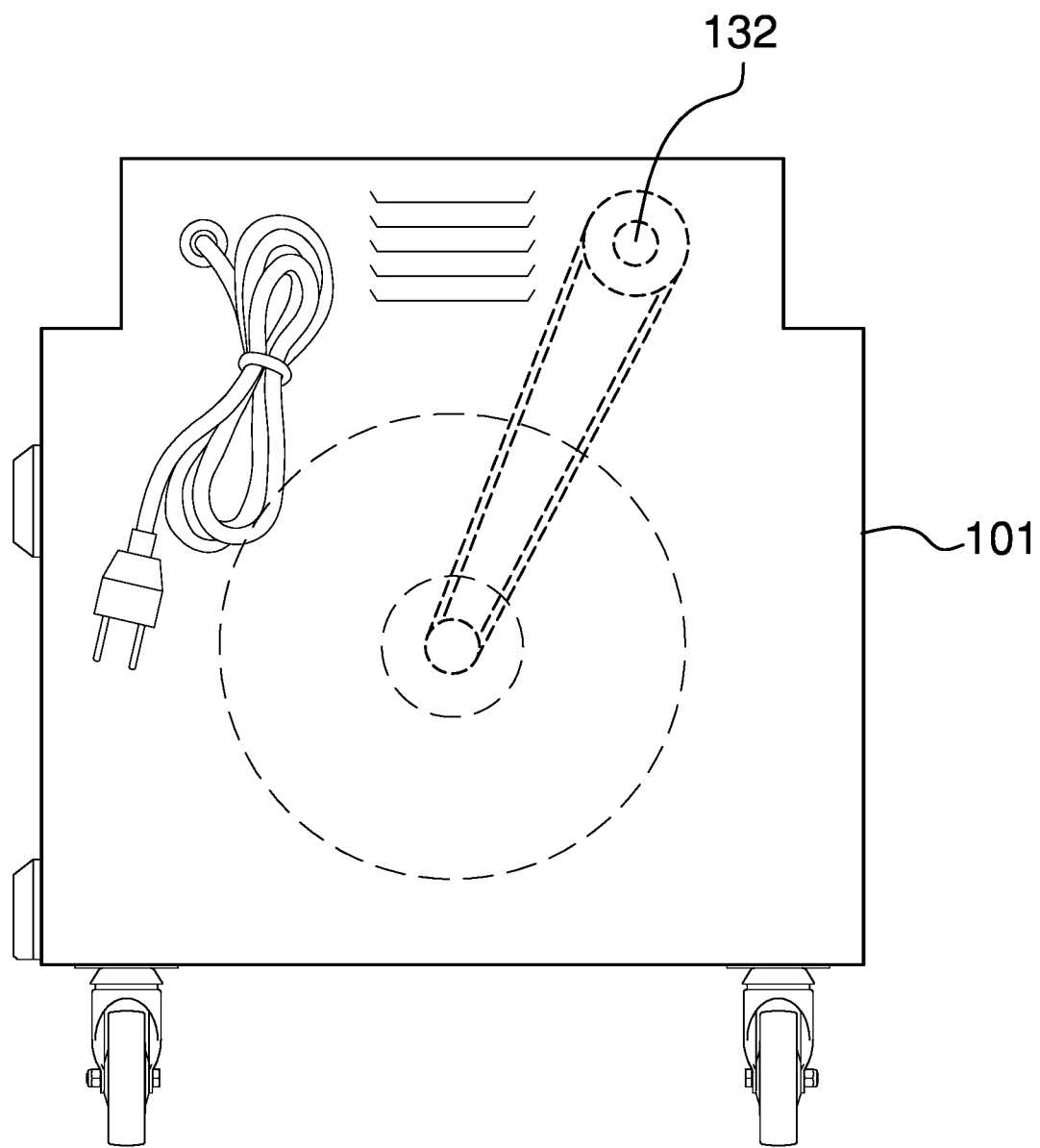
FIG. 4 is a rear view of an embodiment of the disclosure.
Figure 5:
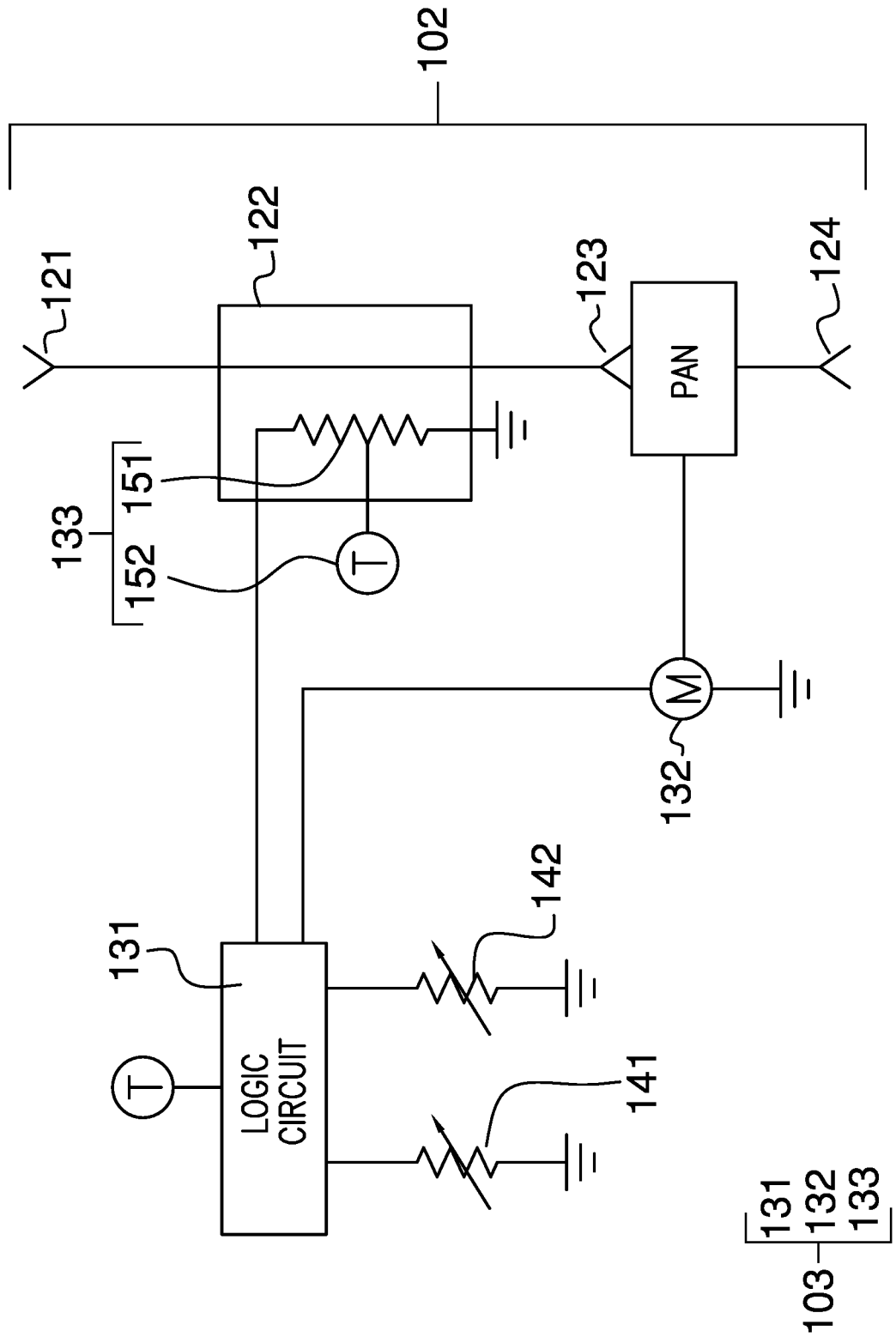
FIG. 5 is a schematic view of an embodiment of the disclosure.

Detailed reference will now be made to one or more potential embodiments of the disclosure, which are illustrated in FIGS. 1 through 5.

The produce washing appliance 100 (hereinafter invention) is an electrically powered mechanical device. The invention 100 is configured for use with vegetables 104. The vegetables 104 are plant based produce. The vegetables 104 are intended for use as a foodstuff. The invention 100 is an appliance that cleans the vegetables 104. The invention 100 comprises a housing structure 101, a fluid transport structure 102, and a control circuit 103. The housing structure 101 contains the fluid transport structure 102, the control circuit 103, and the vegetables 104. The produce washing fluid transport structure 102 provides water used to clean the vegetables 104. The control circuit 103 controls the operation of the invention 100.

The housing structure 101 is a rigid structure. The housing structure 101 contains the fluid transport structure 102 and the control circuit 103. The housing structure 101 is formed with all apertures and form factors necessary to allow the housing structure 101 to accommodate the use and operation of the fluid transport structure 102 and the control circuit 103. The housing structure 101 comprises a shell structure 111, a rotating drum structure 112, and a control housing structure 113.

The shell structure 111 is a rigid structure. The shell structure 111 contains the rotating drum structure 112 and the fluid transport structure 102. The shell structure 111 is formed with all apertures and form factors necessary to allow the shell structure 111 to accommodate the use and operation of the invention 100.

The rotating drum structure 112 is a prism shaped structure. The rotating drum structure 112 is formed with a pan shape. The vegetables 104 are contained within the rotating drum structure 112. The rotating drum structure 112 has a semi-enclosed prism structure. Specifically, the lateral face of the pan structure of the rotating drum structure 112 has a foraminous structure. The foraminous structure allows heated received fresh water to flow through the lateral face of the rotating drum structure 112. The heated received fresh water flows over the vegetables 104 as the heated received fresh water flows through the rotating drum structure 112. The rotating drum structure 112 is a rotating structure. The rotating drum structure 112 rotates relative to the shell structure 111. The heated received fresh water flows through the rotating drum structure 112 while the rotating drum structure 112 is rotating. The rotation of the rotating drum structure 112 ensures that all the surfaces of the vegetables 104 are cleaned by the flow of the heated received fresh water.

The control housing structure 113 is a rigid structure. The control housing structure 113 contains the control circuit 103. The control housing structure 113 is formed with all apertures and form factors necessary to allow the control housing structure 113 to accommodate the use and operation of the control circuit 103.

The fluid transport structure 102 is a fluid network. The fluid transport structure 102 receives fresh water from an externally provided source. The fluid transport structure 102 heats the received fresh water. The fluid transport structure 102 sprays the heated fresh water directly onto the vegetables 104. The fluid transport structure 102 drains the sprayed water away from the vegetables 104. The fluid transport structure 102 discharges the drained water from the fluid transport structure 102. The fluid transport structure 102 comprises an intake fitting 121, a heat exchange structure 122, a spray structure 123, and a discharge fitting 124. The intake fitting 121, the heat exchange structure 122, the spray structure 123, and the discharge fitting 124 are fluidically interconnected.

The intake fitting 121 is a fitting. The intake fitting 121 forms a fluidic connection with an externally provides source of fresh water. The intake fitting 121 forms a fluidic connection with the heat exchange structure 122. The intake fitting 121 transports the fresh water from the externally provided source to the heat exchange structure 122.

The heat exchange structure 122 is a heat transfer device. The heat exchange structure 122 receives the fresh water from the intake fitting 121. The heat exchange structure 122 exposes the received fresh water to a source of heat energy generated by the control circuit 103. The exposure of the received fresh water flowing through the heat exchange structure 122 increases the temperature of the received fresh water to generate the heated received fresh water used to clean the vegetables 104. The heat exchange structure 122 transports the heated received fresh water to the spray structure 123.

The spray structure 123 is a fitting. The spray structure 123 is a spray nozzle. The spray structure 123 forms a fluidic connection with the heat exchange structure 122. The spray structure 123 forms a fluidic connection with the rotating drum structure 112 of the housing structure 101. The spray structure 123 transports the heated received fresh water from the heat exchange structure 122 to the rotating drum structure 112 of the housing structure 101. The spray structure 123 discharges the heated received fresh water as a spray into the rotating drum structure 112.

The discharge fitting 124 is a fitting. The discharge fitting 124 forms a fluidic connection with an externally provides source of fresh water. The discharge fitting 124 receives the water drained from the rotating drum structure 112. The discharge fitting 124 discharges the received drained water from the heat exchange structure 122 from the fluid transport structure 102 into an externally provided drain.

The control circuit 103 is an electric circuit. The control circuit 103 controls the operation of the invention 100. The control circuit 103 rotates the rotating drum structure 112 within the housing structure 101. The control circuit 103 heats the received fresh water flowing through the fluid transport structure 102. The control circuit 103 comprises a logic circuit 131, an electric motor 132, and a heating structure 133. The logic circuit 131, the electric motor 132, and the heating structure 133 are electrically interconnected.

The logic circuit 131 is an electric circuit. The logic circuit 131 controls the operation of the fluid transport structure 102. The logic circuit 131 provides the motive forces used to rotate the rotating drum structure 112 within the housing structure 101. The logic circuit 131 provides the energy used to heat the received fresh water as it flows through the fluid transport structure 102. The logic circuit 131 controls the speed of rotation of the rotating drum structure 112. The logic circuit 131 controls the temperature of the heated received fresh water that is discharged from the heat exchange structure 122 of the fluid transport structure 102. The logic circuit 131 further comprises a first potentiometer 141 and a second potentiometer 142.

The first potentiometer 141 is a potentiometer. The first potentiometer 141 electric connects to the logic circuit 131. The first potentiometer 141 forms an interface with the logic circuit 131. The first potentiometer 141 is externally controlled. The logic circuit 131 monitors the value of the resistance presented to an electric circuit by the first potentiometer 141. The logic circuit 131 uses the first potentiometer 141 to determine the desired speed of rotation of the electric motor 132.

The second potentiometer 142 is a potentiometer. The second potentiometer 142 electric connects to the logic circuit 131. The second potentiometer 142 forms an interface with the logic circuit 131. The second potentiometer 142 is externally controlled.

The logic circuit 131 monitors the value of the resistance presented to an electric circuit by the second potentiometer 142. The logic circuit 131 uses the second potentiometer 142 to determine the desired temperature of the heated received fresh water that is discharged from the heat exchange structure 122.

The electric motor 132 is an electromechanical structure. The electric motor 132 converts electrical energy into rotational energy. The electric motor 132 physically attaches to the rotating drum structure 112. The rotation of the electric motor 132 provides the motive forces used to rotate the rotating drum structure 112. The electric motor 132 electrically connects to the logic circuit 131. The logic circuit 131 controls the speed of rotation of the electric motor 132.

The heating structure 133 is an electric device that physically heats the received fresh water flowing through the heat exchange structure 122. The heating structure 133 mounts in the heat exchange structure 122 of the fluid transport structure 102. The heating structure 133 provides the energy used to heat the received fresh water as it flows through the rotating drum structure 112. The heating structure 133 electrically connects to the logic circuit 131. The logic circuit 131 controls the operation of the heating structure 133. The logic circuit 131 controls and maintains the temperature of the heated received fresh water that is discharged from the heat exchange structure 122. The heating structure 133 further comprises a heating element 151 and a thermostat 152.

The heating element 151 is an electric device. The heating element 151 physically converts electric energy into heat. The heating element 151 provides the heat energy used to heat the received fresh water flowing through the heat exchange structure 122. The heating element 151 is defined elsewhere in this disclosure.

The thermostat 152 electrically connects to the logic circuit 131. The logic circuit 131 uses the thermostat 152 to measure the temperature of the heated received fresh water that is discharged from the heat exchange structure 122. The thermostat 152 is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Appliance: As used in this disclosure, an appliance is a device or instrument intended to perform a single task.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Fitting: As used in this disclosure, a fitting is a component that attaches a first object to one or more additional objects. The fitting is often used to forming a fluidic connection between the first object and the one or more additional objects.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Force of Gravity: As used in this disclosure, the force of gravity refers to a vector that indicates the direction of the pull of gravity on an object at or near the surface of the earth.

Foraminous: As used in this disclosure, foraminous is an adjective that describes a surface, plate, disk, or platform that is perforated with a plurality of apertures.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Heating Element: As used in this disclosure, a heating element is a resistive wire that is used to convert electrical energy into heat. Common metal combinations used to form heat elements include a combination of nickel and Chromium (typical: 80/20), a combination of iron, chromium, and aluminum (typical 70/25/5), a combination of copper, nickel, iron, and manganese (typical 66/30/2/2) (use for continuously hot), and platinum.

Heat Transfer: As used in this disclosure, heat transfer refers an exchange of thermal energy between a first object and a second object. In thermodynamics the first and second objects are often referred to as systems. This disclosure assumes that heat transfer occurs through three mechanisms: conduction, convection, and radiation. By conduction is meant that the heat is exchanged through the contact between the first object and the second object which facilitates the direct transfer of the energy of the vibration of the molecules of the first object to the molecules of the second object. By convection is meant that the heat is transferred through the exchange or movement of mass within and between the first object and the second object. By radiation is meant the transfer of heat energy in the form of (typically electromagnetic) waves between the first object and the second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Circuit: As used in this disclosure, a logic circuit is non-programmable electrical device that receives one or more digital or analog inputs and uses those digital or analog inputs to generate one or more digital or analog outputs. This disclosure assumes that the logic circuit is not a programmable device.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Potentiometer: As used in this disclosure, a potentiometer is an adjustable electrical device that presents a resistance to an electric. The level of resistance is adjustable.

Prism: As used in this disclosure, a prism is a three-dimensional geometric structure wherein: 1) the form factor of two faces of the prism are congruent; and, 2)

the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Shell: As used in this disclosure, a shell is a structure that forms an outer covering intended to contain an object. Shells are often, but not necessarily, rigid or semi-rigid structures that are intended to protect the object contained within it.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Thermostat: As used in this disclosure, a thermostat is a device that monitors the temperature of a space such that the thermostat 1) operates a switch when the measured temperature exceeds or falls below a first preset temperature; and, 2) performs the opposite operation on the switch when the measured temperature falls below or exceeds a second preset temperature. The thermostat is well-known and documented in the electrical arts.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A produce washing appliance consisting essentially of a housing structure, a fluid transport structure, and a control circuit;

wherein the housing structure contains the control circuit;

wherein the control circuit controls the operation of the produce washing appliance;

wherein the produce washing appliance is an appliance that is configured to clean;

wherein the fluid transport structure is a fluid network;

wherein the fluid transport structure receives fresh water from an externally provided source;
wherein the fluid transport structure heats the received fresh water;
wherein the fluid transport structure sprays the heated fresh water directly onto the vegetables;
wherein the fluid transport structure drains the sprayed water away from the vegetables;
wherein the fluid transport structure discharges the drained water from the fluid transport structure;
wherein the control circuit controls the operation of the produce washing appliance;
wherein the control circuit rotates a rotating drum structure within the housing structure;
wherein the control circuit heats the received fresh water flowing through the fluid transport structure;
wherein the housing structure comprises a shell structure, the rotating drum structure, and a control housing structure;
wherein the rotating drum structure mounts in the shell structure;
wherein the control housing structure mounts in the shell structure;
wherein a heating member is an electric device that physically heats the received fresh water flowing through a heat exchange structure;
wherein the heating member mounts in the heat exchange structure of the fluid transport structure;
wherein the heating member provides the energy used to heat the received fresh water as it flows through the rotating drum structure;
wherein the fluid transport structure comprises an intake fitting, the heat exchange structure, a spray structure, and a discharge fitting;
wherein the spray structure sprays the heated fresh water onto an outer surface of the rotating drum structure such that the heated fresh water passes into the rotating drum structure in order for debris to be rinsed off of the vegetables;
wherein the heated fresh water and debris thereafter falls out of the rotating drum structure, and is removed via the discharge fitting from the shell structure.

2. The produce washing appliance according to claim 1
wherein the produce washing appliance is an electrically powered mechanical device.

3. The produce washing appliance according to claim 2
wherein the housing structure is a rigid structure;
wherein the housing structure contains the fluid transport structure and the control circuit.

4. The produce washing appliance according to claim 3
the intake fitting, the heat exchange structure, the spray structure, and the discharge fitting are fluidically interconnected.

5. The produce washing appliance according to claim 4
wherein the control circuit comprises a logic circuit, an electric motor, and the heating member;
wherein the logic circuit, the electric motor, and the heating member are electrically interconnected.

6. The produce washing appliance according to claim 5
wherein the shell structure is a rigid structure;
wherein the shell structure contains the rotating drum structure and the fluid transport structure.

7. The produce washing appliance according to claim 6
wherein the rotating drum structure is formed with a pan shape;
wherein the vegetables are contained within the rotating drum structure;
wherein a lateral face of the pan structure of the rotating drum structure has a foraminous structure;
wherein the rotating drum structure is a rotating structure;
wherein the rotating drum structure rotates relative to the shell structure;
wherein the heated received fresh water flows through the rotating drum structure while the rotating drum structure is rotating;
wherein the rotation of the rotating drum structure ensures that all the surfaces of the vegetables are cleaned by the flow of the heated received fresh water.

8. The produce washing appliance according to claim 7
wherein the control housing structure is a rigid structure;
wherein the control housing structure contains the control circuit.

9. The produce washing appliance according to claim 8
wherein the intake fitting is a fitting;
wherein the intake fitting forms a fluidic connection with an externally provides source of fresh water;
wherein the intake fitting forms a fluidic connection with the heat exchange structure;
wherein the intake fitting transports the fresh water from the externally provided source to the heat exchange structure;
wherein the heat exchange structure is a heat transfer device;
wherein the heat exchange structure receives the fresh water from the intake fitting;
wherein the heat exchange structure exposes the received fresh water to a source of heat energy generated by the control circuit;
wherein the heat exchange structure transports the heated received fresh water to the spray structure;
wherein the spray structure is a fitting;
wherein the spray structure is a spray nozzle;
wherein the spray structure forms a fluidic connection with the heat exchange structure;
wherein the spray structure forms a fluidic connection with the rotating drum structure of the housing structure;
wherein the spray structure transports the heated received fresh water from the heat exchange structure to the rotating drum structure of the housing structure;
wherein the spray structure discharges the heated received fresh water as a spray into the rotating drum structure;
wherein the discharge fitting is a fitting;
wherein the discharge fitting forms a fluidic connection with an externally provides source of fresh water;
wherein the discharge fitting receives the water drained from the rotating drum structure;
wherein the discharge fitting discharges the received drained water from the heat exchange structure from the fluid transport structure into an externally provided drain.

10. The produce washing appliance according to claim 9
wherein the logic circuit is an electric circuit;
wherein the logic circuit controls the operation of the fluid transport structure;
wherein the logic circuit provides the motive forces used to rotate the rotating drum structure within the housing structure;
wherein the logic circuit provides the energy used to heat the received fresh water as it flows through the fluid transport structure;
wherein the logic circuit controls the speed of rotation of the rotating drum structure;

wherein the logic circuit controls the temperature of the heated received fresh water that is discharged from the heat exchange structure of the fluid transport structure;

wherein the logic circuit uses a potentiometer to determine the desired temperature of the heated received fresh water that is discharged from the heat exchange structure;

wherein the electric motor is an electromechanical structure;

wherein the electric motor converts electrical energy into rotational energy;

wherein the electric motor physically attaches to the rotating drum structure;

wherein the rotation of the electric motor provides the motive forces used to rotate the rotating drum structure;

wherein the electric motor electrically connects to the logic circuit;

wherein the logic circuit controls the speed of rotation of the electric motor;

wherein the heating member electrically connects to the logic circuit;

wherein the logic circuit controls the operation of the heating member;

wherein the logic circuit controls and maintains the temperature of the heated received fresh water that is discharged from the heat exchange structure.

\* \* \* \* \*